Patented May 5, 1953

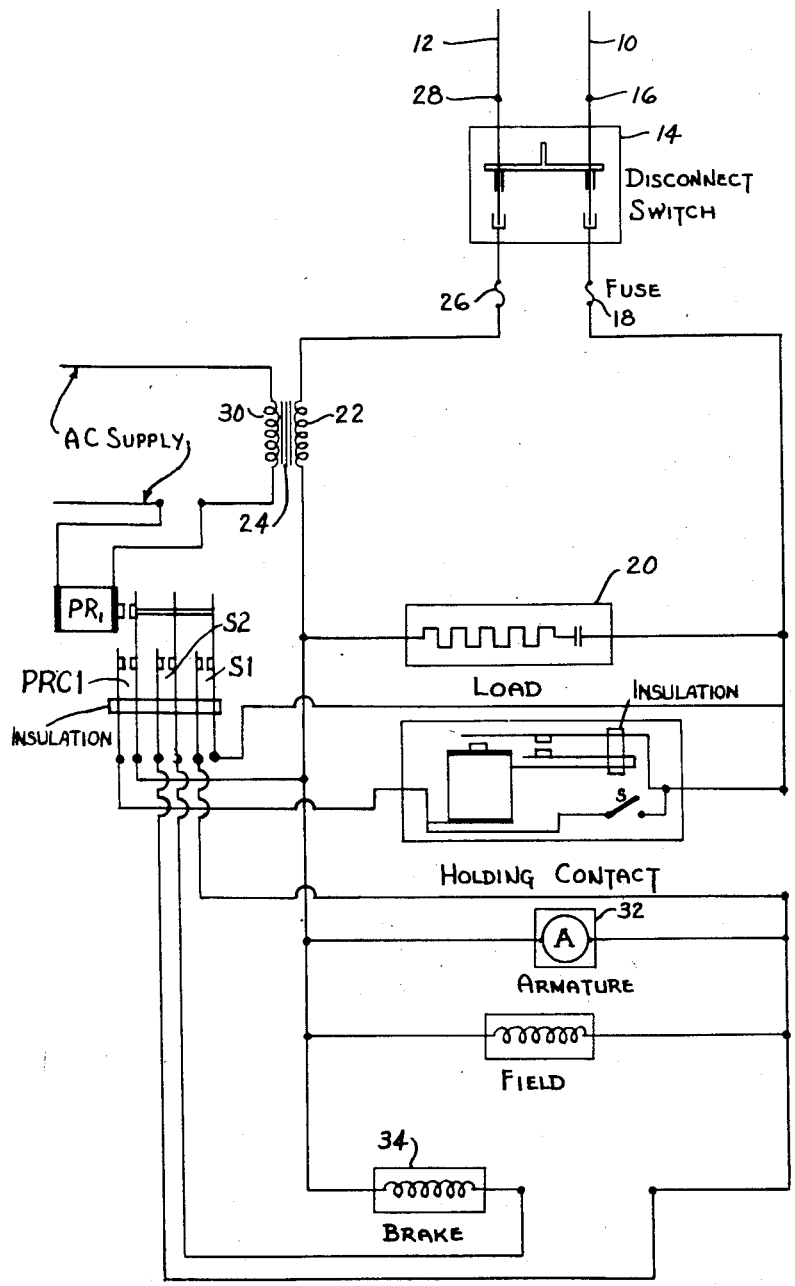

2,637,834

UNITED STATES PATENT OFFICE 2,637,834

PROTECTIVE DEVICE AND ELECTRICAL CIRCUIT

Serge Mignocchi, New York, N. Y., assignor to Serge Elevator Co., Inc., Bronx, N. Y.

Application July 27, 1950, Serial No. 176,123

6 Claims. (Cl. 318—368)

The present invention relates to a protective device and electrical circuit for use in a direct current system operating an elevator, hoist, escalator and the like by means of a shunt or compound motor.

A direct current shunt or compound motor acting as a generator impresses a counter E. M. F. in the power lines. In elevator and the like systems there is provided a brake for the elevator car which is operated by an electro-magnet and, under certain conditions, as by the opening of an overcurrent device or switch since current will not then be supplied to the motor circuit, the counter E. M. F. may hold the brake open and supply current to the motor armature.

Thus the car would be prevented from stopping immediately since the brake would continue to remain open and the motor would continue to act as a generator. Under such conditions, the car or counterweight will strike the bottom of the shaftway before the motor is able to stop, which would result in damages thereto and harm the passengers therein.

The present invention therefore contemplates the provision of a protective device, and an electrical circuit which will prevent the counter E. M. F. which may be developed by a shunt or compound wound motor from energizing the coil controlling the contact in the circuit of the brake magnet to keep open the brake of the elevator and the like and thus prevent its application.

In elevator, hoist, escalator and the like installations operating on direct current, in the event that a fuse or switch fails, there will be no feed back to the line which may cause the motor to increase its speed and thus get out of control and cause possible damage to the equipment of such installations or the passengers served thereby.

The present invention therefore contemplates the provision of a protective device and electrical circuit which will prevent the motor from increasing its speed by spontaneously opening the circuit to the motor upon the failure of a fuse or switch in the power lines.

The present invention relies upon transformer action as it is controlled by the direct current ripple effect generated in the power lines serving the motor operating the elevator, hoist, escalator and the like.

In order to enable those skilled in the art to practice my invention, I have herein described an example thereof to which I have appended a drawing of a wiring diagram of my invention in which The figure is a schematic wiring diagram of a protective circuit and device according to my invention as applied to an elevator, hoist, escalator and the like.

Details of the elevator system and the like are omitted since these will be known to and can be supplied by those skilled in the art to whom this specification is directed. Only such details are given in their simplest surroundings as will be required for an understanding of my invention.

Referring now to the drawing, I refer to a load placed across the power lines 10 and 12 as the closing of a circuit across the load side of the power lines which places the elevator, hoist, escalator and the like in condition to be moved. This may be accomplished before starting the motor by another relay, resistance, coil or door operating motor; in an elevator installation when the door of the elevator car is closed to close the door contacts so that the elevator car may be moved to a selected floor.

Thus when the disconnect switch 14, which may be any conventional switch, is closed and a circuit across the load closed, as described above, a circuit is completed from 16, the fuse 18, load 20, secondary 22 of the transformer 24 to which reference will be made, and thence to fuse 26 and to line 28.

When a load is placed across the lines 10 and 12 (the load side of the power lines) a D. C. ripple is generated, which flows through the secondary 22 of the transformer 24 and induces a corresponding ripple in the primary 30 of that transformer. By D. C. ripple, I mean the fluctuation in voltage that is always present in a direct current line and which therefore is analogous to or the equivalent of an alternating voltage.

In the circuit of the primary 30, I couple the protective relay PR1 which controls and closes the contact S1 in the motor armature 32 circuit and the contact S2 in the brake magnet 34 circuit.

The protective relay PR1, when it is energized, closes the contact PRC1, in the circuit of which is a conventional holding contact S.

Across the primary 30 of the transformer 24, I impress an alternating current voltage, preferably of 110 volts.

Due to the transformer action, when the circuit in which the secondary 22 is found is closed, current will be drawn through the primary 30. This energizes the relay PR1 which closes the contact PRC1. The contact S1 in the circuit of the motor armature 32 and the contact S2 in the circuit of the brake magnet 34 are also closed so that the elevator hoist, escalator and the like may be operated by means of its controller.

Should the circuit to the motor be interrupted, for example, by opening the fuse 18 or 26, current will not be supplied to the secondary 22 of the transformer 24 and the D. C. ripple will stop. Therefore, due to the transformer action, no current will be supplied to the primary 30 of the transformer 24, except for the comparatively small magnetizing or no load current which is not large enough to hold in the protective relay PR1.

Therefore upon opening the circuit to the motor, the protective relay PR1 will drop out to open the contacts PRC1, S1 and S2. Thus the motor cannot perform as a generator and develop a counter E. M. F. and the brake magnet cannot be held in to prevent the brake from operating.

It will therefore be recognized that I have provided a protective device and an electrical circuit which will prevent damage to the electrical equipment of an elevator, hoist, escalator and the like in the event that an over current device or switch in a D. C. circuit is opened which might otherwise cause a counter E. M. F. to be generated that might hold open the brake of an elevator, hoist, escalator and the like and prevent it from stopping.

While I have shown a specific embodiment of my invention, I do not intend to be limited thereto but desire to claim my invention as broadly as the appended claims and the prior art will permit.

I claim:

1. In a protective means for an elevator and the like operating on direct current, a direct current power line, a transformer, the secondary of which is connected in said power line, connections between the primary of said transformer and a source of alternating current, a relay having its winding in series with said primary, a motor connected in a circuit across said direct current power line and means for opening and closing said last circuit to the armature of said motor, said last means including contact arms on said relay controlled by its winding to effect the opening and closing of the circuit to the armature of said motor.

2. In a protective means for an elevator or the like operating on direct current and having a brake operated by an electro-magnet, a direct current power line, a transformer having its secondary winding connected to said power line and having its primary winding connected to a source of alternating current, a relay having its winding in series with said primary, a motor connected across said direct current power line for operating the elevator and the like, an electro-magnet for operating the brake of the elevator or the like bridged in a circuit across said direct current power line, and contacts on said relay connected to said circuit for opening and closing and consequently controlling said electro-magnet.

3. In a means for preventing the generation of a counter E. M. F. by a direct current motor operating an elevator and the like upon the opening of the circuit to the said motor, a direct current power line, a load across said power line, said direct current motor operating the elevator and the like being connected across said power line, a means for opening and closing a circuit to the said motor, a transformer having its secondary connected in said power line and having its primary connected to a source of alternating current, and a relay having its winding in said alternating supply circuit and having contacts controlling said means for opening and closing the circuit to the said motor.

4. In a means for preventing the impression of a counter E. M. F. by a direct current motor operating an elevator and the like upon the opening of the circuit to the said motor whereby the electro-magnet of a brake will not be energized by said counter E. M. F. a direct current power line for said elevator motor, an electro-magnet for a brake means for said elevator, a circuit to said electro-magnet, a means for opening and closing the circuit to the electro-magnet, an alternating current supply circuit, a means for controlling said means for opening and closing the circuit to the electro-magnet and arranged in said alternating current supply circuit and a transformer coupling said alternating current supply circuit to said direct current supply line.

5. In an elevator system having a direct current car operating motor, a direct current line, a circuit connecting the armature of said car operating motor across said direct current line, a means for opening and closing said last-mentioned circuit, an alternating current supply circuit, a means in said alternating current supply circuit for controlling said last-mentioned means for opening and closing the circuit connecting the motor armature and a transformer coupling said alternating current supply circuit to said direct current line.

6. The elevator system of claim 5 and including an electro-magnet of a brake means for an elevator car, a circuit for said electro-magnet across said direct current line and a means for opening and closing said last mentioned circuit and controlled by the control means in said alternating current supply circuit.

SERGE MIGNOCCHI.

References Cited in the file of this patent

UNITED STATES PATENTS

| Number | Name | Date |
|---|---|---|
| 1,781,792 | Rodman | Nov. 18, 1930 |
| 1,903,550 | Meckling | Apr. 11, 1933 |
| 2,129,331 | Littlefield | Sept. 6, 1938 |